No. 637,291.  
J. A. & A. M. SCHEYHING.  
WIRE FENCE MACHINE.  
(Application filed Apr. 7, 1899.)  
Patented Nov. 21, 1899.

(No Model.)  
4 Sheets—Sheet 2.

Witnesses  
Inventors  
John A. Scheyhing  
Aaron M. Scheyhing  
By their Attorneys,

No. 637,291.  
Patented Nov. 21, 1899.  
J. A. & A. M. SCHEYHING.  
WIRE FENCE MACHINE.  
(Application filed Apr. 7, 1899.)  
(No Model.)  
4 Sheets—Sheet 3.

Witnesses  
Jas. K. McCutchran  
H. F. Benders

Inventors  
John A. Scheyhing  
Aaron M. Scheyhing  
By their Attorneys,  
C. A. Snow & Co.

No. 637,291. Patented Nov. 21, 1899.
J. A. & A. M. SCHEYHING.
WIRE FENCE MACHINE.
(Application filed Apr. 7, 1899.)
(No Model.) 4 Sheets—Sheet 4.

Witnesses
John A. Scheyhing
Aaron M. Scheyhing Inventors
By their Attorneys,

UNITED STATES PATENT OFFICE.

JOHN ARTHUR SCHEYHING AND AARON MATHIAS SCHEYHING, OF EATON, OHIO.

WIRE-FENCE MACHINE.

SPECIFICATION forming part of Letters Patent No. 637,291, dated November 21, 1899.

Application filed April 7, 1899. Serial No. 712,090. (No model.)

*To all whom it may concern:*

Be it known that we, JOHN ARTHUR SCHEYHING and AARON MATHIAS SCHEYHING, citizens of the United States, residing at Eaton, in the county of Preble and State of Ohio, have invented a new and useful Wire-Fence Machine, of which the following is a specification.

Our invention relates to wire-fabric machines especially designed for service in the field for the fabrication of a wire fence, although some of the operative parts are capable of embodiment in a stationary machine for use in a factory for the production of wire fabrics.

In the embodiment of the invention we employ a twister mechanism operative by rotating the driving-shaft continuously in one direction for the proper operation of twisting the woof-wires around longitudinal warp wires or strands and of separating the woof-wires in the intervals between the twisting operations to form the mesh. With this woof-wire-twisting mechanism is associated a propelling or advancing mechanism which is operative from the same shaft that drives the twisting mechanism, said propelling or advancing mechanism being operated automatically and intermittently with the twister mechanism at regular intervals and during the periods of shifting the shuttles or spool-carriers, so that the machine may be advanced bodily for the proper spacing of the wires to form the meshes of the fabric.

We are aware that it has been common to provide a portable fence-machine with a twister mechanism and a propelling mechanism; but in most machines of this type the propelling mechanism is operative by hand independently of the twister mechanism. This requires the operator or attendant to operate one mechanism for the twister and another, usually a lever, for the propelling mechanism; but this requires time and attention. We embody in a portable machine the twister mechanism and the propulsion mechanism operative from a single source of power and working in unison one with the other to twist and spread the woof-wires and advance the machine in intervals between the twist and during the separation of the wires, thus dispensing with separate means for the operation of the propulsion devices, simplifying the structure, and saving time and labor in the operation.

We believe ourselves to be the first to embody the twister mechanism and the propelling mechanism, both operative from a single shaft, with means for causing the propelling mechanism to remain inactive during the twisting operation and to automatically come into play during the shifting of the twister elements, and we desire to protect this combination of mechanisms broadly and irrespective of the particular construction which will hereinafter be described as the preferred embodiment of the invention, although we of course make claim to such preferred construction not only of the twister mechanism, but also of the propelling mechanism.

The twister mechanism embraces a series of rotary elements or supports intergeared for operation simultaneously from a single master or power wheel, a series of shuttles or spool-carriers in active relation to said rotary elements, and time-controlled clutch devices operative simultaneously from the master-wheel and adapted to make the shuttles or spool-carriers fast with alternate rotary elements or supports. In one relation of the shuttles to the rotary elements a pair of shuttles are clutched to the alternate rotary elements to rotate therewith twice around the strand-wires, leaving the intermediate rotary elements idle between the active rotary elements; but by the operation of an automatic shifter contrivance this relation of the shuttles to the rotary elements at the completion of the twist is reversed, so that the shuttles are clutched to those twisters which formerly remained idle, and the alternate active twisters thus become the idle twisters, all these operations of rotating and shifting the shuttles being accomplished automatically and by rotating the shaft continuously in one direction.

The timing-clutches are controlled automatically from a single shifting rod or bar, which is actuated from the master-wheel by coacting cams and projections arranged to insure easy and free play to the several parts, and each timing-clutch embraces an oscillating cam-controlled member and another element or member capable of both rotary and endwise movement with relation to the rotary elements or twisters and the shuttles.

The propulsion mechanism in its preferred embodiment contemplates the employment of revoluble grippers arranged to engage with the strand-wires, and is driven at intervals from a mutilated gear that is rotated by the master-wheel, the rotation of the gripper driving-gear being so timed as to rotate the grippers during the periods of the shifting play of the shuttles from the active rotary elements to the previously-inactive rotary elements or twisters.

The invention further consists in the novel combination of mechanisms and in the construction, arrangement, and adaptation of parts, which will be hereinafter more fully described and claimed.

To enable others to understand the invention, we have illustrated a preferred embodiment thereof in the accompanying drawings, forming a part of this specification, and in which—

The same numerals and letters of reference are used to indicate like and corresponding parts in each of the several figures of the drawings.

In embodying our invention in a portable machine adapted for service in a field for the fabrication of a wire fence we employ an upright frame. (Indicated by the numeral 20 in the drawings.) This frame may consist of a single post, as shown by the drawings, or it may be composed of a frame having two main members, each in the form of an angular metallic bar, said frame members being joined rigidly and firmly together in any way which will suggest itself to a skilled constructor. The frame 20 is adapted to carry all of the operating parts of the machine for the application of woof-wires to longitudinal strand-wires and for feeding the machine lengthwise of the strand-wires.

For the accommodation of the rotary elements forming in part the twister mechanism we employ a series of stationary shaft-boxings 21, each of which is cast or otherwise formed in a single piece of metal for simplicity and strength. The shaft-boxings 21 are arranged in series in vertical alinement with each other lengthwise of the machine-frame 20, and said boxings 21 are spaced at proper intervals apart to permit the rotary elements or supports to be spaced correspondingly to the spacing of the strand-wires and for the said rotary elements to be intergeared for rotation simultaneously. Each shaft-boxing is provided at one end with a flange or plate 22, that is fitted laterally against the frame 20 and is secured firmly thereto by suitable screws or other fastening devices, whereby the boxing is held firmly in the frame. One end of a tubular shaft extends beyond the boxing to form a shoulder 23, on which is fitted a bell-shaped mouthpiece 24, that is adapted to permit the strand-wires to pass through the tubular shaft of the rotary element or support. This bell-shaped mouth is especially desirable when barbed wires are used as the longitudinal strands of the fence, and said mouthpiece is fastened securely to the tubular shaft by a suitable screw 25. The opposite end of each boxing 21 is provided with studs 26 27, which project from the outside of said boxing at diametrically opposite points, and one of these studs is engaged with the oscillating member of one time-controlled clutch for the rotary element or support and the shuttles adapted to be carried thereby.

The portable machine of our invention is equipped with a series of ten rotary elements or supports, which are fitted to the series of shaft-boxings in vertical alinement with each other. Nine of these rotary supports are indicated by the reference-letters A, B, C, E, F, G, H, I, and J, and in connection with the series of rotary elements we employ an intermediate rotary master-wheel D, forming one of the train of rotary elements or supports, the wheel D being interposed between the rotary elements C and E and serving as the means by which all of the operative devices for the twister mechanism are actuated from a single power-shaft, the latter also serving as the means for driving the gearing by which the grippers of the propulsion mechanism are rotated intermittently with the operation of said twister mechanism.

Each rotary element or support A to J, inclusive, consists of a tubular shaft 28, a gear 29, and a shuttle-bar 30, all being formed in a single piece of metal. The shuttle-bar 30 is arranged transversely across the face of the gear 29 for its ends to terminate within the pitch-line of the gear-teeth thereon, and the end portions of this shuttle-bar are arranged laterally with respect to the face of the gear in order to form the spaces 31 32 between the shuttle-bar and the face of the gear, said spaces being of sufficient width to accommodate the heads of the shuttles to be hereinafter described. The shuttle-bar of each rotary element or support is notched at its ends, as at 33, in order to receive the central studs on the shuttles, and said rotary support is furthermore provided with clutch-receiving holes 34 35, located diametrically opposite the axis of the tubular shaft and extending through the face of the gear 29 and through the shuttle-bar 30, the clutch-receiving openings lying within the notched ends of the shuttle-bar. The master-wheel D likewise has a tubular shaft 36 and a notched clutch-bar 36ª, so that in some respects the master-wheel resembles the other rotary supports employed in the machine; but this master-wheel is modified in its construction in material respects in order that it may be operated from the driving-shaft and to adapt it for the operation of the shifting device by which the entire train of time-controlled clutches are properly controlled. Said master-wheel is provided with a rim on which is formed a series of gear-teeth 37, having the inner ends thereof beveled at 37ª, and this rim and series of teeth provide an annular flange 38 on the inner part of the master-wheel which lies next to the frame 20. This annular flange is smooth and continuous except for the transverse notch 39, which is formed at one point in the perimeter of said flange. The flange is thus divided or broken, and the ends thereof terminate in rounded edges, (indicated by the numeral 40,) and from the inner face of this master-wheel projects a stud or pin 41, which is situated within the annular divided flange 38 thereof at a point nearly opposite one of the rounded edges 40 of said flange. The external smooth surface of the annular flange 38 is adapted to ride or impinge against the clutch-shifter for the purpose of holding the latter in a stationary position during the rotation of the master-wheel D, but at one point in the rotation of said master-wheel one of the rounded edges 40 of said flange is adapted to impinge against the clutch-shifter for the purpose of moving the latter to a proper position for engagement by the pin 41 on said master-wheel D, so that the shifter will be positioned and operated by the master-wheel, the shifter being rotated on its axis with a step-by-step motion during the continuous rotation of the master-wheel in one direction.

A series of timing-clutches 42 are associated with the series of rotary elements or supports and the master-wheel, and one element of each clutch is arranged to rotate continuously with its corresponding rotary support or element, while the other clutch element is capable of an oscillating movement on the stationary shaft-boxing 21 for the purpose of advancing and retracting the revoluble member of the clutch, whereby the latter is moved endwise simultaneously with its revoluble movement for engagement with the pair of shuttles which are adapted to rotate with the rotary element or support. Each timing-clutch has an oscillating member 43, which is cast in a single piece of metal in a form suitable for application to the protruding end of the shaft-boxing 21. The oscillating member is fitted loosely on the shaft-boxing to turn or oscillate thereon, and it is formed with internal right and left hand spiral grooves 44 45, which receive the diametrically opposite studs 26 27 on the stationary shaft-boxing 21. The oscillating clutch member is thus free to turn on the shaft-boxing and to move endwise thereon, the endwise movement being given to the clutch member 43 by the movement of a shifting clutch-bar, so that the spiral grooves 44 45 will coact with the studs 26 27 on the stationary shaft-boxing. The oscillating clutch member 43 is furthermore provided on one end with an arc-shaped grooved flange 46, and it is formed with a laterally-extending finger 47. The shiftable and rotary member of the clutch is indicated at 48, and it is cast in a single piece of metal. Said clutch member 48 has a continuous annular flange 49 and a corresponding groove 50, and from the clutch member extend diametrically-positioned clutch-arms 51 52. The clutch member 48 has its flange 49 fitted in the grooved flange 46 of the clutch member 43 in a position for the groove 50 of the clutch member 48 to receive the flange 46 on the clutch member 43, and thus the two clutch members are coupled together for the member 48 to partake of the shifting movement of the member 43, while at the same time the member 48 is free to rotate in the grooved flange 46 of the member 43, whereby the member 48 may rotate continuously with the rotary support or element, and the two clutch members are capable of shifting movement or play endwise on the stationary boxing 21. The grooved construction of the two clutch members couples them together against accidental separation when the parts are properly assembled with relation to the shaft-boxing and the rotary support, and the clutch member 48 is disposed closely to the inner face of the gear on the rotary support, so that the clutch-arms 51 52 of said member 48 will pass through the slots or holes 34 in said rotary support. When the pair of shuttles are not connected to the rotary support, the clutch 43 48 is so positioned with relation to the rotary support that the arms 51 52 are retracted flush with the outer face of the gear on the rotary element; but the clutch member 48 has such clutch-arms 51 52 in engagement with the holes or slots 34 35 in order to insure the clutch member 48 rotating with the rotary element or support, thus retaining the clutch in proper position with reference to the rotary element for the clutch-arms 51 52 to engage with the shuttles when the latter are shifted from the active rotary supports to the previously-inactive rotary supports. When this shifting of the shuttles takes place, the clutch member 43 is oscillated by a clutch-shifter for its spiral grooves 44 45 to turn on the stationary studs 26 27, and thereby advance or move the entire clutch endwise, and this endwise movement of the clutch on the stationary shaft-boxing moves the clutch member 48 into close lateral relation with the gear of the rotary support, so as to project the clutch-arms 51 52 beyond the outer face of the gear of said rotary support, and thereby make the clutch-arms engage with the shuttles, such endwise movement of the clutch being effected at the period of shifting movement of the shuttles from the active rotary supports to the inactive supports.

We employ a single clutch-bar 53 for shifting the entire train of timing-clutches 42, said clutch-bar being fitted in a suitable guide or guides 54 on the machine-frame 20. The shiftable clutch-bar is supported on the machine-frame in close relation to the series of timing-clutches for the lateral fingers on the clutch members 43 to engage pivotally or loosely with said clutch-bar. A double yoke 55 is provided on the clutch-bar 53 at a point close to the master-wheel D, and this yoke is formed with internal cam-faces 56 57, which are curved on lines reverse to each other. The driving-clutch shifter 58 is supported by a shaft 59 in a position adjacent to the yoke of the clutch-bar 53, and this clutch-shifter is formed in a single piece of metal with a cam 60 and the flanged disk 61. The shaft 59 of the clutch-shifter passes through the yoke 55 of the shiftable bar 53, and it is supported in a suitable bearing on the machine-frame 20. The clutch-shifter is arranged in such relation to the yoke of the bar 53 and the power-wheel D that its cam 60 will move or play in the yoke 55 while its disk 61 is in active relation to the annular flange 38 on the master-wheel. The disk 61 of said clutch-shifter is provided with two series of flanges 62 63. The main flanges 62 are somewhat longer than the auxiliary flanges 63, and said main flanges lie close to the edge of the smooth annular flange 38 on the master-wheel and in the path of the stud or pin 41 thereon, while the auxiliary flanges 63 are so positioned with relation to the flange 38 on the master-wheel as to ride on the smooth periphery thereof. The short radial flanges 63 are in alternate or staggered relation to the main flanges 62, and these short radial flanges are adapted to be engaged successively by the rounded edges 40 of the broken annular flange 38 when the master-wheel D is rotated, in order that the auxiliary flanges 63 will rotate the clutch-shifter slightly on its axis, and thereby bring one of the main flanges 62 in position for engagement by the stud 41 of said master-wheel. This operation of preliminarily moving the clutch-shifter for the pin or stud 41 on the master-wheel to engage with one of the main flanges 62 on the shifter reduces the jar and vibration on the shifter and insures the easy and steady working of the shifting mechanism when the twister mechanism is operated rapidly.

It will be understood that the master-wheel D is propelled continuously in one direction and that this continuous rotation is communicated to the clutch-shifter through the medium of the flange 38 and the stud or pin 41 engaging with the fingers 62 63 on the disk 61 of said clutch-shifter; but the clutch-shifter is not driven continuously with the master-wheel, as it has a step-by-step movement in one direction communicated thereto. The clutch-shifter is turned a quadrant of a circle at each complete rotation of the master-wheel, and this step-by-step movement of the shifter causes the cam 60 to act alternately against the cam-faces 56 57 on the shiftable bar 53, thus reciprocating the latter alternately in opposite directions. The movement of the shiftable bar under the influence of the cam on the clutch-shifter is sufficient to change the positions of the timing-clutches 42 to advance certain of the clutch members 48 into engagement with the shuttles and to retract certain other clutch members 48 from engagement with said shuttles. The timing-clutches for the rotary elements A, C, E, G, and I are adapted to be advanced into engagement with the shuttles when the timing-clutches for the rotary elements B, D, F, H, and J are retracted from engagement with the shuttles on said rotary elements. This operation is effected by connecting the spirally-grooved members 43 of the timing-clutches with the stationary studs on the shaft-boxings in a manner to make the grooved members of said timing-clutches work opposite to each other—that is to say, the clutch 42 of the rotary element A operates reversely to the corresponding clutch of the rotary element B, and this order in the operation of the timing-clutches is preserved throughout the entire series of clutches for the train of rotary supports or elements forming the twister mechanism, whereby the adjacent timing-clutches operate reversely to each other.

We employ a series of shuttles or spool-carriers which are adapted to be connected with the rotary elements in pairs on alternate rotary elements, and these shuttles are made fast with alternate rotary elements by the members 48 of the timing-clutches in a manner to prevent the shuttles from dropping out of place when connected with the rotary elements and to insure rotation of the pair of said shuttles with the rotary elements for the purpose of twisting the woof-wires around the warps formed by the longitudinal strands of the fence. Each shuttle or spool-carrier is made in a single piece of metal in the form of an open frame, which is provided at its base with a disk 66. The disk of the shuttle is adapted to be fitted in one of the spaces 31 or 32 between the face of the gear and the clutch-bar on the rotary element or support, and said shuttle-disk is engaged by one of the prongs or arms 51 or 52 on the clutch member 48 of the timing-clutch which is associated with the rotary element on which the shuttle is temporarily mounted. The disk 66 of each shuttle is provided with a central stud 67, having the curved faces 68, and said disk is furthermore provided with clutch-apertures 69 70, which are located at diametrically opposite points with relation to the disk 66 and the central stud 67 thereof. In the rotation of a pair of shuttles with one of the rotary supports the shuttles are located on diametrically opposite sides of the tubular shaft forming a part of the rotary support, and the disks 66 of the shuttles are received in the spaces 31 32 between the clutch-bar and the gear of said rotary support. The notched ends of the clutch-bar 30 engage with the central studs 67 on the disks of the shuttles, and the arms 51 52 of the clutch member 48 project through the slots or openings 34 35 of the rotary support and the slots 69 in the disks of the two shuttles, whereby the shuttles are made fast temporarily with one rotary support and are prevented from dropping out of place, because the shuttles are confined against lateral displacement by the bar and gear of the rotary support and against edgewise movement by the engagement of the clutch-bar 30 with the disk-stud 67 and by the prongs or arms of the clutch member 48 with the openings in the disks of said shuttles. This provision of means for preventing the shuttles from dropping out of position when they rotate with the alternate rotary supports, forming in part the twister mechanism, is an important feature of the twister mechanism in our machine, and the certainty of the operation of twisting the woof-wires around the strand-wires is thereby promoted. The means for connecting the pair of shuttles to a rotary support are very simple in construction and positive in their operation. Each shuttle is designed to carry a bobbin or spool 71, on which is coiled the wire adapted to form the woof of the fabric, and each bobbin or spool is arranged within the open frame of the shuttle, so as to be held in position therein by suitable trunnions or clamping-screws 72.

The entire series of rotary supports for the twister mechanism, as well as the propulsion mechanism for advancing the machine bodily, is operated from a main driving-shaft 73, which is journaled in a suitable bearing 74, that is attached firmly to the frame 20, at one side thereof, said bearing being braced in its proper position with relation to the master-wheel D by a stay 75, which is fastened at its ends to the frame 20. The inner end of this main driving-shaft 73 is equipped with a bevel-pinion 76, the teeth of which are adapted to mesh with the beveled ends 37$^a$ of the series of gear-teeth 37 on the periphery of the master-wheel D. The driving-shaft 73 may be equipped with a hand-crank 77 or other suitable means for rotating said shaft continuously in one direction.

In the embodiment of our invention in a portable fence-machine we equip the lower end of the frame 20, which is disposed in a vertical position, with a track-wheel 78, that is idly journaled on an arbor or bolt 79, mounted in a pair of bearing-plates 80, which are secured firmly to the foot of the post or frame 20, and this frame is, furthermore, provided with a handle 81, which is shown in the form of a bail having its ends secured firmly to the frame 20, so that the operator may steady the machine and pull the same in a direction to assist in its advancement.

We will now proceed to describe the propulsion mechanism, which is adapted to frictionally grip certain of the line-wires or longitudinal strands for the purpose of advancing or feeding the machine lengthwise of said strands across the field. In this connection it is to be recalled that the shaft of the master-wheel D is designed to rotate the grippers of the propulsion mechanism, and to effect this end the shaft 36 has one end extended to receive a bevel gear-pinion 82, the purpose of which will presently appear.

A brace-bracket 83 is secured firmly to the frame 20 on the opposite side from the twister mechanism, and said bracket extends outwardly from the frame, above and parallel to the shaft 36 of the master-wheel D, the outer end of said bracket being provided with spaced vertical openings 84.

85 86 designate the pair of gripper-shafts which are arranged in upright or vertical positions on the side of the machine opposite to the twister mechanism, and these gripper-shafts are disposed in parallel relation to each other, so as to lie on opposite sides of the vertical series of strand-wires which are stretched across the field, said shafts passing freely or idly through the openings 84 in the fixed brace-bracket 83.

For supporting the parallel gripper-shafts we provide upper and lower bearing-brackets 87 88, and these bearing-brackets are each constructed in sections adjustably connected together and provided with means for drawing the sections and the gripper-shafts adjustably together for the purpose of making the gripper-heads on said shafts engage frictionally with the strand-wires. Each bracket 87 or 88 is provided with a stationary yoke 89, which is integral with a base-plate 89$^a$, that is fastened firmly to the frame 20 between a pair of flanges 22 on adjacent shaft-boxings 21, and the stationary yoke 89 forms spaced bearings for the gripper-shaft 85, near the upper and lower ends thereof. Each bracket is furthermore provided with a movable yoke 90, which is pivoted to the stationary part of the bracket by a vertical pin or bolt 91, and the movable yokes 90 of the upper and lower brackets provide bearings for the gripper-shaft 86, near its respective ends. The yokes of each bearing-bracket 87 or 88 are adapted to be drawn together by an adjustable bolt 92, which passes through suitable openings in the yokes at one side of the gripper-shafts and in a manner for the head of the bolt to bear against the movable yoke while the nut of said bolt bears against the stationary yoke.

The gripper-shafts 85 86 are provided with pairs of gripper-heads 93, and in the drawings we have shown each gripper-shaft as having a series of four heads, the heads on one gripper-shaft being disposed in corresponding relation to the heads on the other gripper-shaft, whereby the series of heads are grouped in pairs adapted to engage with opposite sides of the strand-wires. It will be understood that the number of gripper-heads on the shafts is not material and that the same may be increased or decreased at will, but we prefer to employ four heads on the two shafts, near the upper ends thereof, and a like number on the shafts near the lower ends thereof, so that the yokes of the bearing-brackets may fit between the said heads on the shafts in a manner to restrain the shafts against vertical movement within the yokes of said brackets. If desired, suitable washers may be interposed between the yokes and the heads to reduce the friction on the parts, and if necessary the adjusting-bolts 92 may be provided with yieldable or spring-tension devices adapted to yieldingly hold the pairs of gripper-heads in contact with the strand-wires. The gripper-heads may each have smooth frictional working surfaces, but one or more of the gripper-heads may be provided with serrated working faces, an instance of which is represented by the numeral 94$^a$ on the head at the upper extremity of the gripper-shaft 85.

Figure 15:
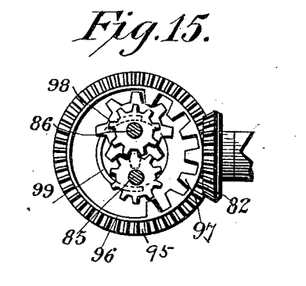
Fig. 15 is a cross-section through the gripper mechanism, on the line 15 15 of Fig. 1, looking in the direction indicated by the arrow X.
Figure 16:
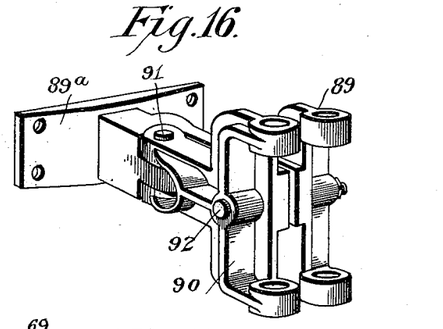
Fig. 16 is a detail view of one of the two-part brackets for the gripper-shafts.
Figure 17:
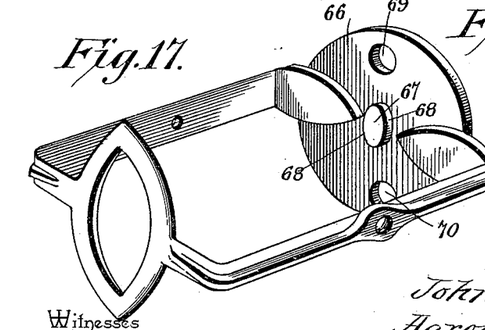
Fig. 17 is a detail perspective view of one of the shuttles.
Figure 18:
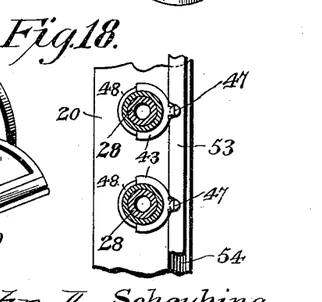
Fig. 18 is a detail sectional view through a series of two of the shiftable clutches, showing said clutches engaged with a shipping-rod.

94 designates the gripper driving-gear, which is arranged in a horizontal position beneath the outer end of the fixed brace-bracket 83, so as to bear firmly against the latter, and said gear 94 is provided in its hub with an enlarged central opening 94$^b$, which permits the two gripper-shafts to pass freely through said hub and enables the driving-gear to rotate freely around the shafts. This gear 94 is provided on its periphery with a continuous series of bevel gear-teeth 95, and it is furthermore provided with a depending annular flange 96, the inner surface of which is formed with a series of spur-gear teeth 97. These internal teeth 97 do not extend continuously around the flange of the gear 94, but, as shown by Fig. 15, these teeth extend only about halfway around the flange, thus forming a mutilated gear on the flange of the gripper driving-gear 94. On the gripper-shaft 86 is firmly secured a double spur gear-pinion 98, which lies contiguous to the gripper driving-gear 94, and one member of this double pinion 98 is arranged to mesh with a single gear-pinion on the gripper-shaft 85, while the other member of said double pinion 98 meshes with the internal mutilated teeth 97 on the gripper driving-gear. This driving-gear 94 is held against displacement with relation to the gripper-shafts by an annular flange 99, resting upon the double pinion 98, and the hub of said gear bearing against the lower face of the brace-bracket 83. The gripper driving-gear 94 is arranged for its bevel-teeth 95 to mesh directly with the bevel-pinion 82 on the shaft 36 of the master-wheel D, and thus the gear 94 is adapted to rotate continuously around the gripper-shafts 85 86. The gripper-shafts are geared directly together for rotation in opposite directions, and during one-half of the rotation of the gear 94 the gripper-shafts are adapted to remain at rest, because the internal teeth 97 do not engage with the double pinion 98, but in the continued rotation of the gear 94 the teeth 97 thereof intermesh with the teeth of the pinion 98 for rotating one gripper-shaft, which in turn propels the other gripper-shaft. The driving-gear for the propelling mechanism formed by the gripper-shafts allows the latter to remain idle or at rest during the periods of rotation of the shuttles with the rotary supports or elements; but when the shuttles are shifted from certain rotary elements to the alternate rotary elements the driving-gear 94 actuates the gripper-shafts to rotate the latter and advance the machine simultaneously with the spread of the woof-wires from the shuttles.

Figure 1:
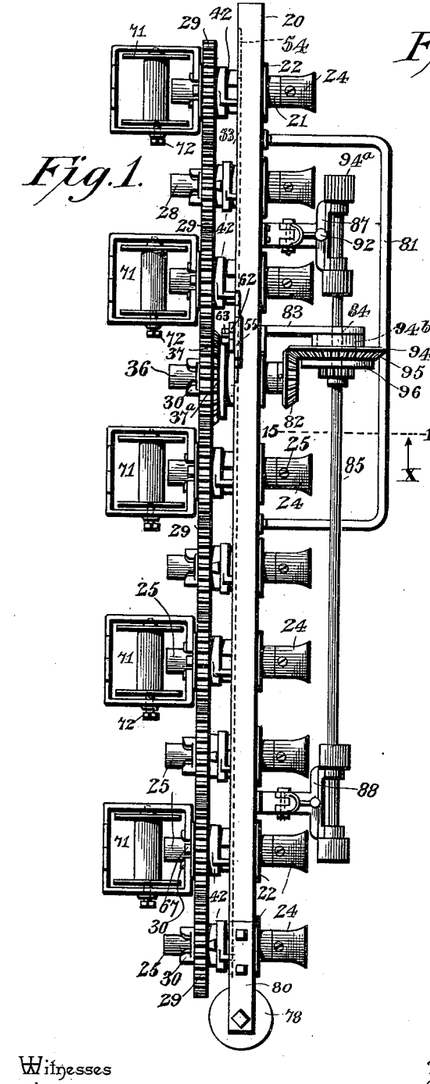
Figure 1 is a side elevation of a fence-machine constructed in accordance with our invention.
Figure 2:
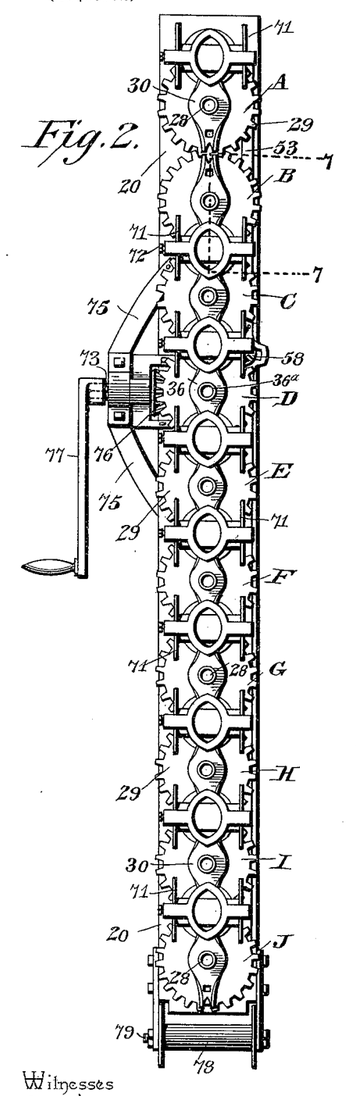
Fig. 2 is an elevation of the twister mechanism, with the shuttles in one position to rotate with the alternate rotary elements.
Figure 3:
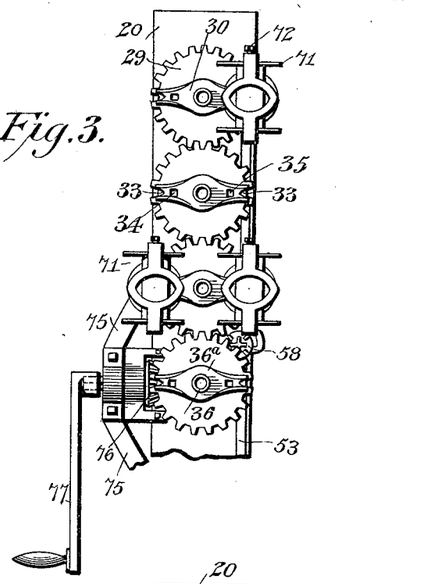
Fig. 3 is an elevation of part of the twister mechanism, with the rotary elements partially turned and with the shuttles in proper relation to said rotary elements for twisting the woof-wires around the longitudinal strands.
Figure 4:
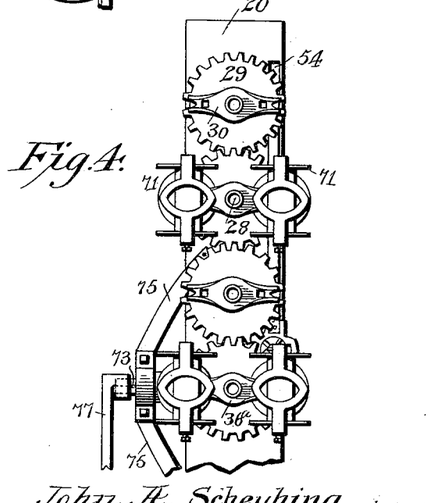
Fig. 4 is an elevation of a part of the twister mechanism, with the shuttles in reverse positions and connected operatively with the previously-inactive twisters shown by Fig. 2.
Figure 5:
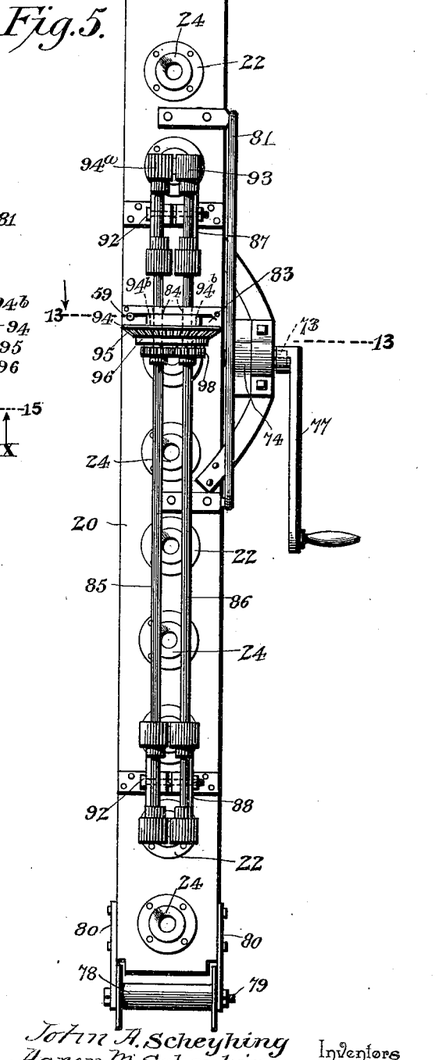
Fig. 5 is a front elevation of the machine looking at the opposite side from the twister mechanism and illustrating the propelling mechanism.
Figures 6, 7, 8, 9, 10, 11, 12, 19:
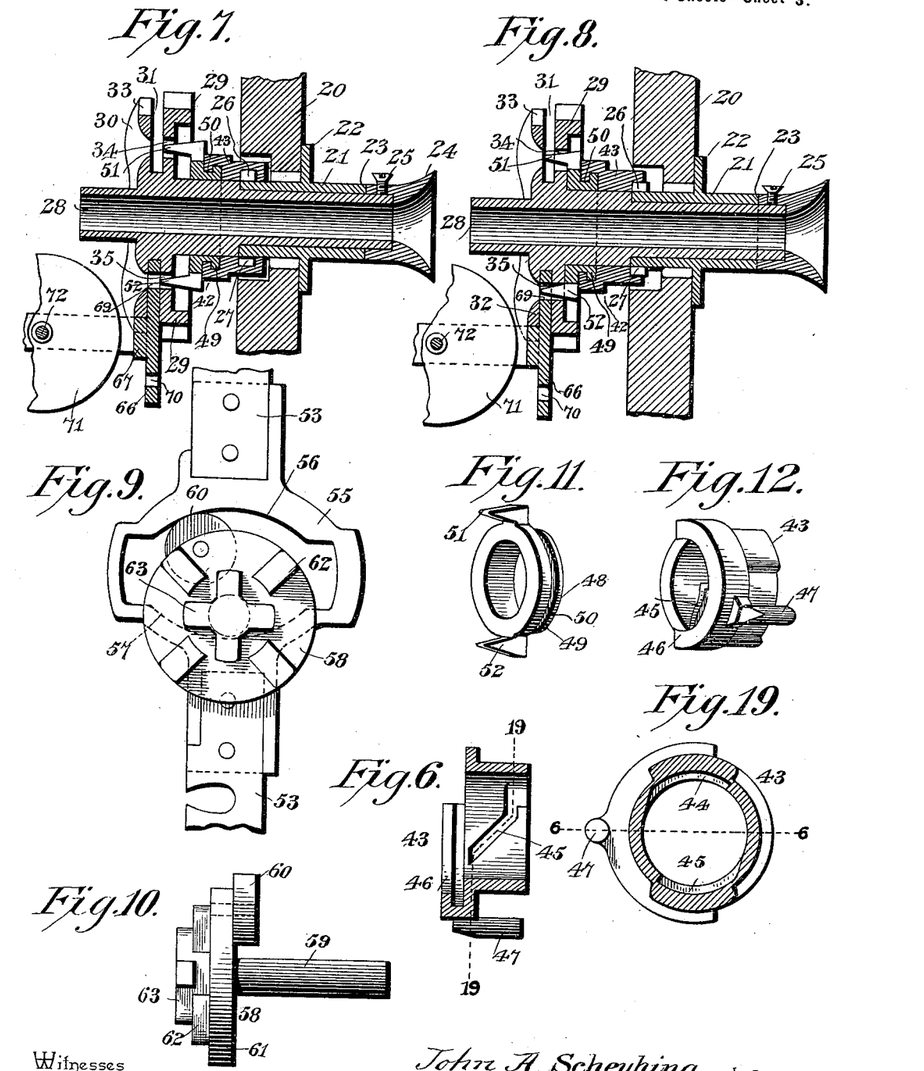
Fig. 6 is a cross-section of one member of one clutch shown by Figs. 11, 12, and 19, the plane of section being indicated by the line 6 6 of Fig. 19.
Fig. 7 is a longitudinal section through one of the rotary elements or supports forming a part of the twister mechanism and showing the timing-clutch retracted from engagement with the shuttle, the plane of section being indicated by the dotted line 7 7 of Fig. 2.
Fig. 8 is a section similar to Fig. 7, with the timing-clutch projected or advanced to engage with the shuttles to insure rotation thereof with one of the rotary elements or supports.
Fig. 9 is an elevation of the clutch-shifter.
Fig. 10 is a side view of the shifter-cam removed from the machine.
Figs. 11 and 12 are detail perspective views of the two members forming one of the time-controlled clutches.
Fig. 19 is a cross-section of one clutch member on the line 19 19 of Fig. 6.
Figures 13, 14:
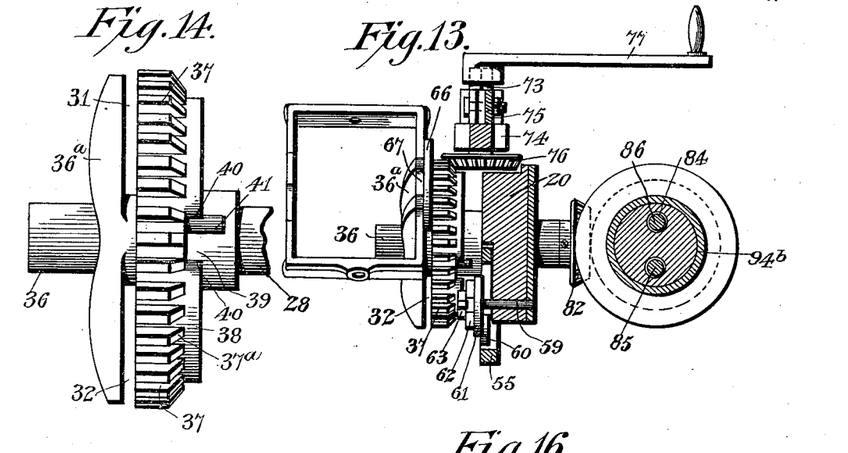
Fig. 13 is a transverse sectional view through the master-wheel, the driving-shaft, and a part of the propelling mechanism, the plane of the section being indicated by the dotted line 13 13 of Fig. 5.
Fig. 14 is an edge view of the master-wheel.

In the operation of the machine in the open field for the fabrication of a wire fence the line-wires are stretched between the posts at proper intervals from each other, and they are passed through the tubular shafts of the series of rotary supports A to J, inclusive, on the machine. The spools or bobbins having been previously wound with wire of proper size to form the meshes of the fence fabric are fitted to the open frames of the shuttle-carriers and suitably confined therein for rotation on their axes to permit the woof-wires to be drawn or uncoiled freely from said spools. With the twister mechanism in a position shown by Fig. 2 of the drawings the series of shuttles are engaged with the rotary supports A C E G I by the advancement of the members 48 of the clutches associated with said supports; but the clutches of the other supports B D F H J are retracted for the prongs or arms of the clutch members 48 to engage with said supports and make the clutch members 48 rotate idly therewith. In this position of the elements the teeth 97 of the gripper driving-gear 94 are free from the double pinion 98 of the gripper-shafts to allow the propelling mechanism to remain at rest, although the gripper driving-gear 94 rotates continuously with the shaft of the master-wheel D. On the rotation of the driving-shaft 73 the master-wheel D is driven to rotate the supports or elements A to J, inclusive, simultaneously, the elements A C E G I rotating in one direction and carrying therewith the series of shuttles to constitute the active rotary elements, while the alternate rotary elements B D F H J rotate in the opposite direction and form for the time being the inactive supports or elements. As the series of supports A C E G I begin their rotation the shuttles travel with them, said shuttles being made fast therewith by the clutches, so as to assume the positions shown by Fig. 3, and as the driving-shaft 73 is rotated by hand in the proper direction the shuttles travel with said elements A C E G I until each pair of shuttles shall have made two complete turns around the axes afforded by the shafts of said series of rotary supports, whereby the woof-wires of the shuttles which travel with said active rotary supports are twisted around the alternate line-wires. Now on the completion of the second rotary movement of the elements A C E G I with the crank-shaft 73 rotating in the same direction the shuttles arrive at positions where the studs 67 on the heads thereof coincide with the notched ends of the clutch-bars 30 on the previously inactive series of rotary supports B D F H J, and at this instant the cam of the clutch-shifter 58 acts on the yoke of the shiftable bar 53 to quickly move the latter in one direction for retracting the clutches of the elements A C E G I from engagement with the shuttles and to simultaneously advance the clutches of the members B D F H J, whereby the clutches make the shuttles fast with the last-named series of rotary elements, and the shuttles are thus transferred automatically from the series of rotary elements A C E G I to the alternate series of elements B D F H J. At the period of shifting the shuttles the gripper driving-gear 94 engages with the bevel gear-pinion 98 to rotate the gripper-shafts, and thus the machine is advanced by the propulsion mechanism simultaneously with the spread of the woof-wires due to the shifting of the shuttles from one series of rotary elements to the other alternate series of rotary elements, and when the gripper driving-gear 94 shall have made a half-turn it is automatically thrown out of mesh with the double pinion 98 on the gripper-shaft 86 to allow the propulsion mechanism to remain at rest temporarily. The shuttles in their new relations and in the series of supports B D F H J, as shown by Fig. 4, rotate with said series of the elements twice around the axes afforded by the shafts of said elements, and thus the woof-wires from the bobbin on the elements B D F H J are coiled on those longitudinal strands which alternate with the strands around which the woof-wires were first twisted. At the completion of the second rotation of the series of rotary elements B D F H J the clutch-shifter is actuated by the master-wheel to move the shifting-bar in the opposite direction, and thus the alternate clutches are reversed and restored to their initial positions for the purpose of releasing the shuttles from the series of rotary supports B D F H J and making said shuttles fast with the other series of supports A C E G I. At the same time the propelling mechanism is rotated by the gripper driving-gear 94 to advance the machine, the driving-shaft being propelled at all times continuously in one direction. These operations are continued until the supply of woof-wire in the bobbins shall have been exhausted or the desired length of the fence shall have been woven. In the event of exhaustion of the woof-wires the bobbins may easily be removed from the shuttles and a fresh supply of wire coiled thereon, after which the filled bobbins may easily be replaced in the shuttles, because the latter are accessible at all times to the operator.

Although we have described and illustrated the twister mechanism as embodied in a portable machine and adapted for use conjointly with a propelling mechanism by which the machine is advanced automatically in the intervals between the periods of rotation of the shuttles with the rotary supports around the line-wires, we do not desire to strictly confine ourselves to the employment of the described twister mechanism in connection with the propelling mechanism, because we are aware that parts of our invention—as, for instance, the twister mechanism, including the time-controlled clutches—may be embodied in the construction of a machine especially adapted for use in a factory for the manufacture of wire fabrics.

Changes in the form, proportion, size, and the minor details of construction within the scope of the appended claims may be resorted to without departing from the spirit or sacrificing any of the advantages of this invention.

One important feature of the propelling mechanism of our machine is the gripper driving-gear 94, which fits loosely around the gripper-shafts and is adapted to be adjusted or turned to the right or left for the purpose of bringing its internal gear-segment 97 into mesh at variable periods in the operation of the machine, so as to adapt the machine for making square mesh fabric or different shapes in the mesh of the fence in the course of erection in the field.

With the propelling mechanism may be associated suitable guides for the line-wires, which guides may be supported on the brackets or other suitable part of the machine and disposed in advance of the gripper-heads.

What we claim is—

1. In a portable fence-machine, the combination with the frame, of the twister mechanism, a propelling mechanism for advancing the machine bodily, and a driving mechanism operatively connected with the twister mechanism and with the propelling mechanism, and having means for causing the latter to remain inactive during the twisting operation, and to automatically come into play during the shifting of the twister elements, substantially as set forth.

2. In a portable fence-machine, the combination with a frame, of a twister mechanism having shuttles arranged in pairs to rotate around a common center and to shift laterally with respect to each other, a propelling mechanism for advancing the machine bodily, and a driving mechanism connected operatively to the twister mechanism and the propelling mechanism for actuating the latter during the periods of the shiftable play of the shuttles, substantially as described.

3. In a portable fence-machine, the combination with a frame, of a twister mechanism having the shuttles, a propelling mechanism with gripper devices arranged to engage with line-wires and to advance the machine bodily, and a driving mechanism operatively connected with the twister mechanism and with the propelling mechanism to actuate the grippers thereof during the periods of the shiftable movement of the shuttles, substantially as described.

4. In a portable fence-machine, the combination with a frame, of a propelling mechanism provided with revoluble gripper-shafts having the heads arranged in groups to grip the line-wires of a fence, a driving-shaft intergeared with the gripper-shafts to rotate the latter intermittently, and a twister mechanism having the shiftable shuttles and driven from the same shaft that actuates the propelling mechanism, substantially as described.

5. In a portable fence-machine, the combination with a frame, of a propelling mechanism having the revoluble grippers arranged in groups to engage with the line-wires of a fence, a twister mechanism with the shiftable shuttles, a driving-shaft actuating the twister mechanism, and gearing between said driving-shaft and the grippers for rotating the latter intermittently and in the intervals between the rotation of the shuttles around the axes of rotary supports forming elements of the twister mechanism, substantially as described.

6. In a portable fence-machine, a gripping mechanism consisting of parallel shafts intergeared together for rotation in opposite directions simultaneously, and means geared to one of the shafts for rotating the same, substantially as described.

7. In a portable fence-machine, a propelling or advancing mechanism consisting of gripper-shafts provided with the heads arranged in groups to receive line-wires between themselves, and gearing for rotating the gripper shafts and heads in opposite directions simultaneously, substantially as described.

8. In a portable fence-machine, a propelling mechanism for advancing or feeding the machine consisting of parallel shafts provided with gripper-heads arranged in groups to receive the line-wires between themselves, a driving-shaft, and gearing between said driving-shaft and the gripper-shafts to rotate the latter simultaneously in opposite directions, one element of the driving-gear rotating continuously with the driving-shaft, substantially as described.

9. In a portable fence-machine, a propelling mechanism for advancing the machine bodily consisting of parallel shafts having the gripper-heads arranged in groups to receive line-wires between themselves, gearing connecting the two shafts directly together and rotating the same in opposite directions, a driving-shaft, and a gripper driving-gear supported concentric with said parallel shafts to rotate freely around the same and intermeshing with a driving-shaft and with a pinion on one of said parallel shafts, substantially as described.

10. In a portable fence-machine, a propelling mechanism consisting of parallel shafts having the gripper-heads, a driving-shaft, and driving-gearing between said shaft and the parallel shafts to rotate the latter intermittently while one member of said driving-gear rotates continuously, substantially as described.

11. In a portable fence-machine, a propelling mechanism consisting of parallel shafts having gripper-heads arranged in groups or pairs, a double pinion on one of said shafts and geared to the other shaft directly for rotating the gripper-heads in opposite directions, a gripper driving-gear rotating around the parallel shafts and having internal teeth arranged to mesh with the compound pinion, and a driving-shaft meshing with said driving-gear, substantially as described.

12. In a portable fence-machine, a propelling mechanism consisting of shafts having gripper-heads arranged in groups or pairs, a compound pinion fast with one of the shafts and geared directly to the other shaft, a driving-gear having internal teeth forming a mutilated gear-segment arranged to mesh with the compound pinion and rotate the parallel shafts intermittently, and a driving-shaft meshing with the driving-gear to rotate the latter continuously, substantially as described.

13. In a portable fence-machine, a propelling mechanism consisting of shafts having the gripper-heads, adjustable supporting devices connected with said shafts and adapted to draw the shafts and the gripper-heads thereon into lateral relation to each other, and a driving-gear for rotating the shafts in opposite directions, substantially as described.

14. In a portable fence-machine, a propelling mechanism consisting of parallel shafts having the gripper-heads, means for adjusting the shafts and heads laterally with respect to each other, and a driving-gear for rotating the shafts and heads in opposite directions, substantially as described.

15. In a portable fence-machine, a propelling-gear consisting of parallel shafts having the gripper-heads, supporting-brackets having adjustable members furnishing the bearings for said shafts and adapted to adjust the latter relatively to each other, and gearing for rotating said shafts and the heads thereon, substantially as described.

16. In a portable fence-machine, a propelling mechanism comprising the fixed brackets having a stationary yoke and the pivoted yokes, means for adjusting the pivoted yokes with relation to the stationary yokes, gripper-shafts journaled respectively in the stationary and movable yokes of said brackets, and a driving-gear operatively connected with said shafts, substantially as described.

17. In a portable fence-machine, a propelling mechanism consisting of stationary brackets having the rigid yokes, movable yokes jointed to said brackets, bolts for adjustably confining the movable yokes with relation to the stationary yokes, gripper-shafts journaled in the stationary and movable yokes of the brackets and provided with the gripper-heads arranged in groups or pairs, and a driving-gear connected operatively with the gripper-shafts to rotate the latter in opposite directions, substantially as described.

18. In a fence-making machine, a twister mechanism consisting of a series of intergeared rotary supports, driving mechanism for said intergeared rotary supports, shiftable clutches associated with and carried by each rotary support, and shifting devices, operated by the driving mechanism, for adjusting the shuttle-engaging elements of the clutches, substantially as set forth.

19. In a fence-machine, a twister mechanism consisting of a series of intergeared rotary supports, a clutch mechanism for each rotary support and having a member shiftable laterally with relation to and arranged to normally engage with said gear to rotate therewith, means for shifting the entire train of clutches simultaneously, and shuttles actively fitted to the rotary supports and adapted to be made fast therewith by the laterally-shiftable members of the clutches, substantially as described.

20. In a fence-machine, the combination with a series of rotary supports, of a train of shiftable clutches associated individually with said supports and each having a revoluble member which turns at all times with its support, and a shifting mechanism connected with each clutch and operative from one of said rotary supports, substantially as described.

21. In a fence-machine, the combination with a series of rotary supports, of a train of shiftable clutches each having its members revolubly coupled together and one of said members normally fitted to the support with which said clutch is associated, coacting cams and projections for moving the other member of each clutch, the shuttles, and a shifting device connected with all the clutches to control the relation of the revoluble clutch members to said shuttles, substantially as described.

22. In a fence-machine, the combination with a series of rotary supports, and shaft-bearings thereof, of a train of two-part clutches each fitted to one shaft-bearing in active relation to the latter and one rotary support, one member of said clutch engaging with the bearing to be shifted endwise and the other clutch member being connected revolubly with the rotary support and the shifting clutch member, the shuttles connected shiftably with said supports, and a clutch-shifting device connected with the train of clutches, substantially as described.

23. In a fence-machine, the combination with rotary supports, and shaft-bearings therefor, of two-part clutches each having a cam-grooved member connected with studs on the bearing and also provided with a revoluble member which is connected normally with the rotary support and the oscillating member, and a shifting device associated with the shiftable clutch members, substantially as described.

24. In a fence-machine, a two-part clutch comprising an oscillating member with a grooved flange and a revoluble member coupled to said oscillating member to rotate freely thereon, combined with rotary supports which are fitted to the revoluble clutch members, and means for changing the relation of the connected clutch members to said supports, substantially as described.

25. In a fence-machine, a two-part clutch comprising an oscillating member having the spiral grooves coacting with fixed projections and a revoluble member coupled with the shiftable member to be movable endwise therewith and to rotate freely thereon, combined with rotary supports, the shuttles, and a shifting device, substantially as described.

26. In a fence-making machine, a twister mechanism comprising rotary supports, a series of clutches having members shiftable laterally with relation to the supports and longitudinally of the axes thereof, shuttles carried by said supports, and a shifting mechanism operated from one of the supports and connected with the clutches, substantially as set forth.

27. In a fence-machine, a twister mechanism comprising rotary slotted supports each having a clutch-bar, shuttles provided with studded heads arranged to fit between the supports and the clutch-bars and having the studs located to be engaged by the clutch-bars, and clutches coöperating with the shuttles and the rotary supports to hold the shuttles against dropping out of the supports during the rotation thereof, substantially as described.

28. In a fence-machine, a twister mechanism comprising rotary slotted supports having the spaced and notched clutch-bars, the shuttles each having a slotted and studded head operatively fitted to the rotary supports, and shiftable clutches each having a revoluble member arranged to engage with the rotary supports and the shuttles thereon, substantially as described.

29. In a fence-machine, a twister mechanism comprising a series of intergeared rotary supports each having means for supporting a shuttle and said supports arranged to be rotated in opposite directions simultaneously for one series of supports to be active and the other intermediate series of supports to remain inactive temporarily, a train of clutch devices each associated with one of said supports and having a rotary member normally in engagement with one rotary support, a shifting appliance connected with each of the clutches and arranged to throw the revoluble members of the clutches on the active series of twisters into projected positions and to retract the revoluble clutch members of the inactive supports, and shiftable shuttles connected in pairs to the active rotary supports by the active clutches to rotate with said supports around the axes thereof and adapted to be shifted automatically, by reversal of the clutches, into like engagement with the temporarily-inactive supports, substantially as described.

30. In a fence-machine, a twister mechanism comprising shaft-bearings each having the fixed stud, rotary supports fitted to the bearings, a two-part clutch for each bearing and support and each clutch having a cam-grooved member fitted to the stud to be shifted endwise thereby and also having a member which is coupled revolubly to the support and the shiftable clutch member to be retracted and advanced by the latter, means for turning the shiftable clutch members on their axes, and shuttles fitted actively to the rotary supports, substantially as described.

31. In a fence-machine, the combination with a series of rotary shuttle-supports, of a master-wheel for driving said supports, clutches having elements shiftable laterally with relation to the supports and longitudinally of the axes thereof, and a shifting mechanism connected with said clutches and connected operatively with the master-wheel to be actuated at intervals thereby, substantially as described.

32. In a fence-making machine, the combination with a series of rotary shuttle-supports, of a master-wheel for driving said supports, clutches having elements shiftable laterally with relation to the supports and longitudinally of the axes thereof, a clutch-shifter interposed in the path of the master-wheel and rotated thereby in one direction with a step-by-step movement, and connections between the clutch-shifter and the clutches, substantially as set forth.

33. In a fence-machine, the combination with a series of rotary shuttle-supports, of a master-wheel for driving said supports, shiftable clutches coöperating with the supports, a clutch-shifter interposed in the path of the master-wheel and rotated continuously in one direction with a step-by-step movement by said wheel and provided with a cam, and a shiftable rod or bar connected to the clutches and lying in the path of the shifter-cam, substantially as described.

34. In a fence-machine, the combination with a series of rotary shuttle-supports, and shiftable clutches, of a master-wheel for rotating said supports and having a stud, a revoluble shifter-wheel having fingers lying in the path of said stud and also provided with a cam, and a shiftable bar connected with the clutches and disposed in the path of said cam, substantially as described.

35. In a fence-machine, the combination with a series of rotary shuttle-supports, and shiftable clutches, of a master-wheel for rotating said supports, a revoluble clutch-shifter, coöperating devices on the master-wheel and the clutch-shifter to preliminarily position the shifter and to turn the latter in an arc by the movement of the wheel, and connections between the clutch-shafts and the clutches, substantially as described.

36. In a fence-machine, the combination with a series of rotary supports, and shiftable clutches, of a master-wheel geared to said supports and having a divided annular flange and the stud, a clutch-shifter provided with fingers arranged alternately and disposed respectively in the path of said flange and the stud of the master-wheel, and connections between the clutch-shifter and the clutches, substantially as described.

37. In a portable fence-machine, the combination of a series of rotary shuttle-supports, each having a shuttle-clutch, a master-wheel geared to said rotary supports, a clutch-shifting mechanism operative by the master-wheel and connected with the shuttle-clutches, a propelling mechanism independent of the twister mechanism and having gripper devices for advancing the machine bodily, gearing between the master-wheel and the gripper devices for rotating the latter intermittently, and a continuously-operative shaft geared to the master-wheel, substantially as described.

38. In a portable fence-machine, a propelling mechanism comprising revoluble grippers, means for adjusting said grippers laterally to make them engage tightly with strand-wires of a fence, and a driving mechanism actively connected with grippers, substantially as described.

39. In a portable fence-machine, a propelling mechanism comprising sectional supporting devices having means for adjusting the members thereof laterally with respect to one another, gripper-shafts journaled in corresponding members of the supports and each having gripper-heads arranged in groups to receive fence-wires, and a driving mechanism connected actively with the gripper-shafts to rotate the same under all adjustments of the sectional supports, substantially as described.

In testimony that we claim the foregoing as our own we have hereto affixed our signatures in the presence of two witnesses.

JOHN ARTHUR SCHEYHING.
AARON MATHIAS SCHEYHING.

Witnesses:
M. D. TYRRELL,
C. W. EIDSON.